(12) United States Patent  (10) Patent No.: US 6,393,338 B1
Kemnitz  (45) Date of Patent: May 21, 2002

(54) APPARATUS AND CONTROL METHOD FOR ACCURATE ROTARY PERISTALTIC PUMP FILLING

(76) Inventor: Tadeusz Kemnitz, 3701-P Highgate Dr., Durham, NC (US) 27713

( * ) Notice: Subject to any disclaimer, the term of this patent is extended or adjusted under 35 U.S.C. 154(b) by 0 days.

(21) Appl. No.: 09/528,044

(22) Filed: Mar. 17, 2000

(51) Int. Cl.$^7$ ............................. G06F 17/00; F04B 49/00
(52) U.S. Cl. ............................ 700/231; 417/22; 417/45
(58) Field of Search ............................... 700/231, 282; 417/22, 45, 53

(56) References Cited

U.S. PATENT DOCUMENTS

| | | | |
|---|---|---|---|
| 4,715,786 A | 12/1987 | Wolff et al. ................. 417/22 |
| 4,834,630 A | 5/1989 | Godwin ..................... 417/475 |
| 4,910,682 A | 3/1990 | Wolff et al. ................ 364/510 |
| 5,003,239 A | 3/1991 | Matthews et al. ........... 318/600 |
| 5,040,106 A | * 8/1991 | Maag ...................... 700/282 X |
| 5,056,036 A | * 10/1991 | Van Bork ................. 700/282 X |
| 5,257,917 A | 11/1993 | Minarik et al. .............. 417/475 |
| 5,318,413 A | * 6/1994 | Bertoncini .............. 417/475 X |
| 5,538,405 A | * 7/1996 | Patno et al. ............ 417/326 X |
| 5,733,257 A | 3/1998 | Sternby ..................... 604/27 |
| 5,846,061 A | * 12/1998 | Ledebuhr et al. .... 417/477.9 X |

* cited by examiner

Primary Examiner—Christopher P. Ellis
Assistant Examiner—Gene O. Crawford

(74) Attorney, Agent, or Firm—Clifford F. Rey; Charles Chapek

(57) ABSTRACT

A filling machine with a rotary peristaltic dispenser that compensates for the nonlinear flow rate characteristic of the dispenser to increase product fill accuracy is disclosed. A computer processor including associated electronic circuitry and programs is provided for defining, digitizing and storing the real pulsating flow rate characteristic of the dispenser. In order to ensure a precise delivery of the filled product, the computer calculates the angular rotation of the rotor needed to deliver the desired fill weight for each filling cycle. The angular rotation needed to maintain a uniform fill weight is generally different for each filling cycle. The current position of the rotor is first established prior to each filling cycle and then located on a stored look-up table containing the flow rate characteristic as a starting point for digital integration of the characteristic over the angular distance of the driver. The computer then integrates the digitized flow characteristic based on the look-up table in the computer memory, starting from the current rotor position one step at a time. Each step represents a small regular angular increment of the dispense rotor. After each step of integration, the subtotal of the calculated amount is compared to the calibrated set-point until the desire set-point fill weight is reached. When the integrated subtotal reaches the set-point the integration stops. The number of steps used during the integration establishes the target distance of the system driver. The system then advances the driver by the calculated angular distance, thus ensuring the delivery of the required product weight with high precision. As a result, the apparatus and control method of the present invention takes into account the pulsating nature of the rotary peristaltic dispenser.

5 Claims, 9 Drawing Sheets

APPARATUS AND CONTROL METHOD FOR ACCURATE ROTARY PERISTALTIC PUMP FILLING

BACKGROUND OF THE INVENTION

1. Field of the Invention

The present invention relates to filling machines of the rotary peristaltic pump type and, more particularly, to an apparatus and method for improving the dispensing accuracy of such peristaltic pump filling machines.

The use of electronically controlled filling machines or pumps that dispense gases, liquids, semi-liquids, pastes, powders and solids prior to packaging is well known in the prior art and is becoming widespread in many industries. These machines typically include a product supply means, a driving device to propel the supplied product and filling nozzles for directing the product into a collection container Assisting devices such as shut-off valves at the output of the nozzle or a so-called suck-back system for dripless and clean operation are sometimes used to assure proper and clean operation of the filling machine.

Filling machines are generally classified by the type of driving device used (e.g. gravity type for dispensing solids and liquids, piston type for dispensing liquids and gases, rotary pumps for dispensing liquids and gases, and auger screw and vibrators for dispensing solids and powders).

In gravity fillers the product is driven by gravity through a controlled valve into the nozzle and collection container. The flow rate of the product in gravity type fillers is relatively uniform, and the amount of product dispensed is controlled by adjusting the time for closing the valve. In more precise systems weight feedback is used to control the volume of dispensed product.

In piston driven filling machines, the product enters the dispensing cylinder by opening an infeed valve, moving the piston in a reverse direction, closing the infeed valve, opening a discharge valve, and driving the piston in the opposite direction so that the product is propelled to the nozzle and into the collection container. The volume of the filled product is controlled by adjusting the stroke of the piston.

In rotary pumps and augers, the volume of product is controlled by timing the actuation and stopping of the driver, by controlling the angular distance of the driver or by stopping the driver upon receiving feedback on the amount already dispensed.

The filling machines described above generally treat the flow rate or alternatively the dispensed volume as a periodic function of driver position. For example, in the case of gravity filling, each cycle uses the same parameter values for activating and stopping a driver. In the case of piston filling, each cycle uses the same stroke to deliver a given fill volume. In the case of an auger screw or rotary pump, each angular rotation is treated as delivering the same volume.

The present invention relates to a rotary peristaltic pumps which are typically regarded as delivering a fixed volume for each angular rotation of the driver. The flow rate of the peristaltic pump has been compared to the flow of product pumped by a continuously running piston filler. In the case of the piston filler, in order to achieve fill precision in each collection container, it may be necessary to control the piston movement, so it will move an integer number (including zero) of piston strokes plus a fraction of the next stroke depending on the fill weight required and the volume of the filling cylinder. In conventional rotary peristaltic pumps the quantity of product delivered is also regarded as a fixed volume per revolution of a dispenser pump.

Such a rotary peristaltic pump may be rotated by a variable-speed electric motor, a servo-motor, a stepping motor, or other suitable drive mechanism Rotary peristaltic pumps are preferred for many filling applications due to their ability to pump fluids through tubing without any contact between pump components and the fluid being pumped. In a typical rotary peristaltic pump system, one or more lengths of tubing are contacted by a series of rollers that generally rotate in a circular path so as to squeeze the tubing against a curved wall surface. This provides a moving region or regions of compression along the length of tubing. Movement of the compressed region of the tubing forces fluid ahead of the moving region, and the action of the tubing in returning to its uncompressed condition creates a partial vacuum, which effects forward flow of the fluid from the region behind the compressed region Rotary peristaltic pumps operate such that the material first introduced is the material first expelled to avoid the possibility that stagnant pockets of product may occur which result in breeding places for potentially harmful bacteria, thus posing sanitary problems.

It has been heretofore assumed that repeating cycles of the same angular rotation of a rotary peristaltic dispenser will deliver consistent quantities of product. However, a problem typically associated with such rotary peristaltic pumps is that it is difficult to obtain accurate and repeatable volume dispensing from them.

2. Description of Related Prior Art

Several prior art patents have dealt with improvements in pumping accuracy. One example of such a prior art device is disclosed in U.S. Pat. No. 4,715,786 ('786 patent) which enhances accuracy by direct measurement of parameters relating to volume dispensed, motor speed and flow rate. These readings are accumulated in counters that are updated on a real time basis. The contents of the counters are used to increment other counters and can be reset at particular real time intervals. By accumulating exact counts relating to volume, motor speed and time, the parameters of flow rate, revolutions per minute and cumulative volume are calculated. One aspect of the ('786) patent includes the calculation of a calibration constant relating known increments of angular rotation of the pump to a known fluid volume. This constant is used to determine flow rate and total or cumulative volume by counting angular increments of pump rotation, and assumes that for every angular displacement of the pump head, a known constant quantity of fluid is pumped.

Another prior art method for obtaining enhanced accuracy in peristaltic pumps is disclosed in U.S. Pat. No. 4,910,682 wherein the calibration constant is compared against a predetermined value, which causes the control to enter into either a high flow mode or a low flow mode. In the low flow mode, volumes are resolved to a higher accuracy than in the high flow mode. However, under this method almost the entire quantity of product is dispensed in the high flow mode. Thereafter, an intermittent operation of the pump brings the quantity dispensed to the desired volume. This invention again assumes that for every angular displacement of the pump head, a known constant quantity of fluid is pumped.

Encoder wheels have also been used in the prior art to improve the accuracy of rotary peristaltic pumps by monitoring the rotation of the drive shaft in small angular sectors. An example of the use of such an encoder wheel is provided in U.S. Pat. No. 5,003,239.

U.S. Pat. No. 5,733,257 discloses a method for calibrating a peristaltic pump comprising an internal fluid flow meter. Fluid is introduced into the pump segment and is pumped by the peristaltic pump at a substantially constant rotation rate. Three different inlet pressures are obtained and measured by a pressure meter and the corresponding fluid flow is measured by the internal fluid flow meter for obtaining calibration pair values. A calibration curve is calculated from said pair values by a computer inside the filling machine. The actual fluid flow rate is determined by the computer from the calibration curve based on the actual inlet pressure and the actual revolution rate of the propelling means.

In each of the prior art examples recited hereinabove, it is assumed that the same angular distance of the driver will cause the delivery of the same volume of the product once the pump has been calibrated. However, this simple calibration factor or calibration coefficient takes into account only the physical characteristics of the pump and associated tubing. This model assumes that the relation between the distance of the pump rotor and the dispensed volume of the product is a linear function with a constant coefficient linking two variables: volume and angular distance. The problem with this model is that the real flow of a rotary peristaltic pump has a pulsating character wherein the number of pulses in a single 360 degree revolution of the driver or rotor is equal to the number of rollers of the pump.

When the simple calibration factor described above is utilized, a relatively large absolute error in the quantity of dispensed product results. This error is larger when peristaltic tubes of a larger inner diameter are used to achieve high production speeds. The error is even more significant when filling small volumes.

In order to reduce the absolute error created by the simple calibration factor, more rollers can be utilized to dispense the product. This results in a higher frequency of pulses and a lower degree of amplitude.

Recognizing that the pulsating character of peristaltic pumps affects flow, some prior art pumps have attempted to reduce flow pulsation. One prior art example for reducing pulsation in peristaltic pump outflow is set forth in U.S. Pat. No. 4,834,630 which discloses a segmented rotor having rollers in a first segment being staggered or alternated with respect to rollers in a second segment, with each segment engaging a plurality of fluid conduits, and with each tube engaged by the first segment being connected by a T-shaped coupler to one engaged by the second segment on the output side of the pump. Another technique that has been used is to employ twin tubes engaged by a pair of offset, spring-loaded tracks in a single peristaltic pump-head, with the flow form the twin tubes directed to a single tube by a Y-connector.

Still another prior art example limiting the effect of flow pulsation is disclosed in U.S. Pat. No. 5,257,917 wherein a peristaltic pump comprises a rotor and a plurality of removable cartridges associated with the rotor, wherein occlusion beds of the cartridges are configured to enable the outflow characteristics of the pump to be varied by manipulation or interchanging of the cartridges, such that the pump may in one operation have synchronous flow to all of its parallel flow channels, or may in a second mode of operation have non-synchronous phase-offset flow to respective ones of the parallel flow channels. In the second mode of operation, manifolding of the output flow from respective ones of the parallel flow channels can be employed to provide flow of substantially reduced pulsation.

The weakness of these models is again the assumption that the relation between the distance of the pump rotor and the dispensed volume of the product is a linear function with a constant coefficient linking the volume and angular distance of the driver. Although reduction of pulsation reduces the error arising from the assumption of a linear relationship between volume and angular distance of the driver, there is much room for improvement by not treating the relationship between flow rate or volume and the angular distance of the driver as linear.

SUMMARY OF THE INVENTION

Accordingly, the present invention provides a filling machine with a rotary peristaltic dispenser that compensates for the nonlinear, real flow rate characteristic of the dispenser so as to increase product fill accuracy. In the present invention a computer processor with associated electronic circuitry and software programs are provided for defining, digitizing and storing the real pulsating flow rate characteristic of the rotary peristaltic dispenser. In order to ensure a precise delivery of the filled product, the computer calculates the angular rotation of the rotor needed to deliver the desired fill weight for each filling cycle based on the nonlinear, real flow characteristic of the dispenser pump. Because the angular rotation needed to maintain a uniform fill weight is different for each filling cycle, the computer processor continuously monitors the position of the dispense rotor in relation to the flow characteristic. The current position of the rotor is established prior to each filling cycle either by calculation from a signal provided by a sensing means such as a position transducer to sense the position of the rotor, or by a signal sent directly to the driver. The current position is then located on a look-up table stored in the computer containing the flow characteristic as a starting point for digital integration of the characteristic over the distance of the driver.

The computer then integrates the digitized flow characteristic based on the look-up table starting from the current rotor position one step at a time. Each step represents a small regular angular increment of the dispense rotor. After each step of integration, the subtotal of the calculated amount is compared to a calibrated set-point until the desired set-point fill weight is reached. When the integrated subtotal reaches the set-point, the integration stops. The number of steps used during the integration establishes the target distance of the system driver. The present system then advances the driver by the calculated angular distance thereby ensuring the delivery of the required product weight with high precision.

Thus, the apparatus and control system of the present invention take into account the pulsating character of the peristaltic dispenser. This is fundamentally different from prior art methods, in which the filling stroke of the rotor is simplified to be a linear constant. While the present invention is illustrated for the filling of liquids, it is equally applicable for filling other products such as gases, semiliquids, pastes, viscous and nonvisous and solid products, either by weight or volumetric amounts where the flow characteristic is a periodic function of a system driver position.

Other features and advantages of the present invention will become apparent from a study of the following description and accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

FIG. 4b is a graphical representation illustrating the flow rate versus angular distance of the rotor for the nine different stages of the filling cycle shown in FIG. 4a;

DETAILED DESCRIPTION OF THE PREFERRED EMBODIMENT

Figure 1:
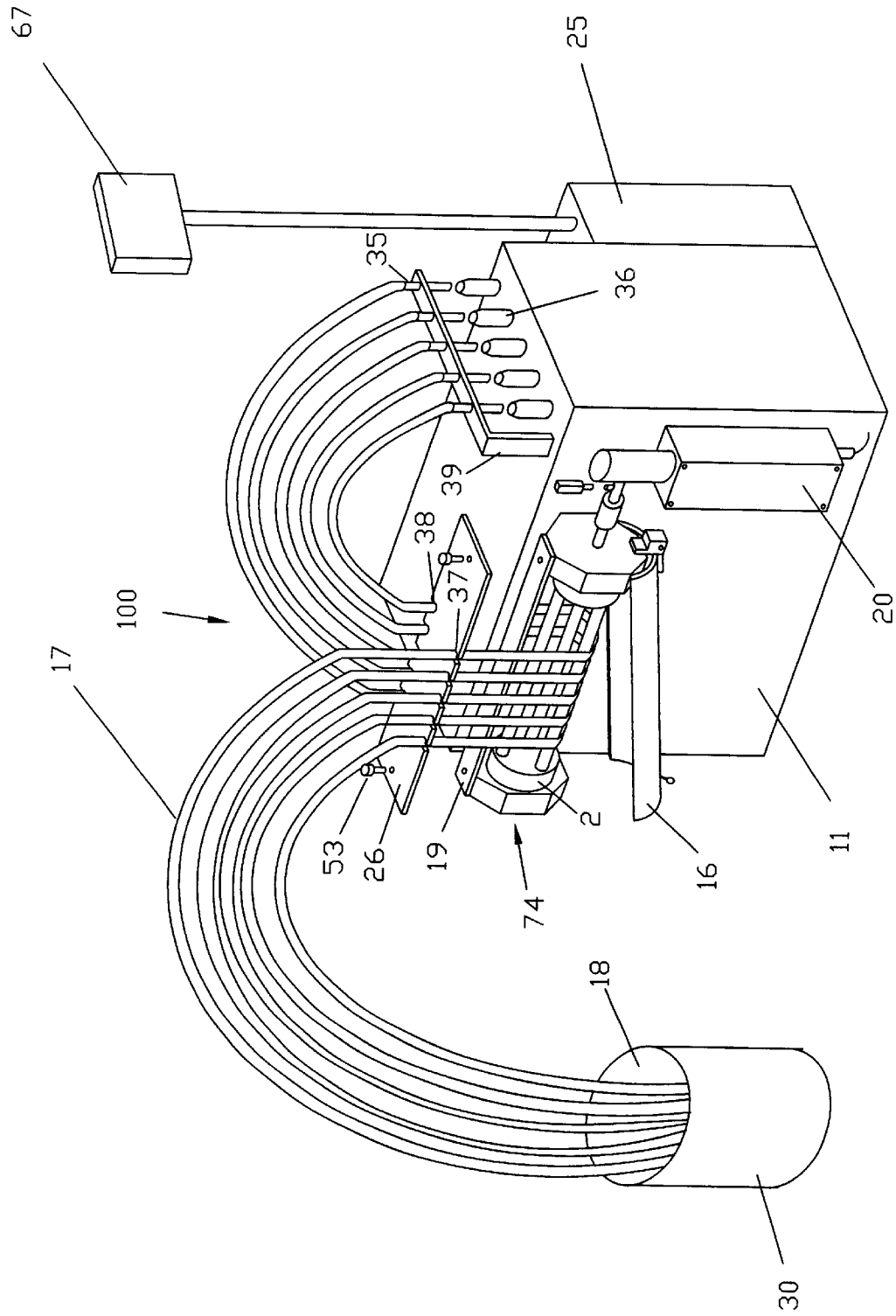
FIG. 1 is a perspective view showing the filling machine of the present invention in operative association with the fill product and collection containers with the top plate of the dispenser being elevated for clarity of illustration.

With further reference to the drawings there is shown therein a rotary peristatic filling machine in accordance with the present invention, indicated generally at 100 and illustrated in FIG. 1. The filling machine 100 includes a machine base 11, a rotary peristaltic dispenser 74 mounted on the machine base 11, a plurality of flexible transfer tubes 17, a bracket 39 for mounting a plurality of discharge nozzles 35 on said machine base 11, a control cabinet 25, a console 67 to provide means of interaction with the master computer, and a control system (not shown) including electrical circuitry disposed within the filling machine 100 to direct the operation thereof.

The control cabinet 25 is electrically connected to a variable-speed electric motor 20 to provide the driving power for the dispenser 74. The control cabinet 25 contains circuitry associated with the filling machine 10, and includes the following components as represented in the block diagram of FIG. 6: computer 68, dispense driver controller 70, position transducer 22, and main program 78.

Referring again to FIG. 1, the top plate 26 of the dispenser 74 is shown in an elevated position to facilitate viewing the interior of the dispenser. A pair of bolts 53 is used to secure top plate 26 on cross plate 19. The upper ends of each of the transfer tubes 17 are connected to discharge nozzles 35. The transfer tubes 17 are appropriately loaded through the dispenser 74 and the lower end of the tubes 17 are disposed in fluid communication with the product supply 18 within the receptacle 30. To permit easy access to load or remove the flexible transfer tubes 17 from the dispenser chamber 32, a curved backing plate 16 is secured at one end by hinge 47, and at the other end by latch 45 as more clearly shown in FIG. 2 in closed position. When locked in place by a latch 45, the curved backing plate 16 provides a contact surface against which the flexible tubes 17 are compressed by the rollers 8.

The flexible transfer tubes 17 are disposed substantially in parallel and enter the dispensing chamber 32 through a first row of preferably equally spaced slots ending in circular recesses 37 in top plate 19 as clearly seen in FIG. 1. The slots permit the tubing to be pulled to the circular recesses 37 permitting easy loading and unloading of the tubes. The flexible tubes 17 form an internal loop within the dispenser chamber 32 being trained around the set of rollers 8 and exiting the dispenser chamber 32 through a second row of slots ending in circular recesses 38. The entry and exit slots are aligned such that the flexible tubes 17 extend in parallel. Once the transfer tubes 17 are loaded into the dispenser 74, the tubes are secured to top plate 26 by clamping means 24 at the entering and exiting circular recesses of the top plate 26.

Clamping at the exiting circular recesses may be necessary if clamping is intended for adjustment of flow so that all tubes deliver the same fill volume. For example, if greater flow is desired through one tube, the tube can be released and clamped at a higher tension. Higher tension results in smaller diameter and thus a reduced flow rate. Clamping can be done by individual clamps 24 or by a clamping fixture (not shown), which can clamp all the tubes simultaneously. Once the flexible tubes 17 are loaded and the curved backing plate is secured, a full occlusion of the tubes should result.

In operation, the rotation imparted to each roller 8 causes the roller to traverse and compress the tubes 17 in a positive manner without slippage or frictional drag on the tubes 17. When rotated, the rollers 8 press against and urge fluid through the flexible tubes 17, establishing flow between the inlet and outlet ends of the tubes at a desired flow rate. The plastic tubing comprising tubes 17 is deformable and has elastic memory so it is able to return to its original shape after being deformed by the moving rollers 8 during operation.

As is well known in the operation of peristaltic pumps, moving regions of compression are intermittently created along the length of the tube to push fluid within the tube forwardly from the compressed region. Fill product 18 is dispensed in highly precise quantities into appropriate collection containers 36 positioned under the discharge nozzles 35. It should be noted that the pump is bidirectional and can be operated in reverse to move fluid back into receptacle 30 containing product supply 18.

It will be understood that the product supply 18 and the collection containers 36 are not part of the filling machine 100 per se and are shown only to demonstrate the operation of the apparatus.

As a safety feature, the filling machine 100 may include a guard (not shown) that shields the upper open portion of the dispenser 74. Further, in some applications it may be preferable to connect the lengths of flexible tubing to a manifold (not shown) to combine the outflow therefrom.

Figure 2:
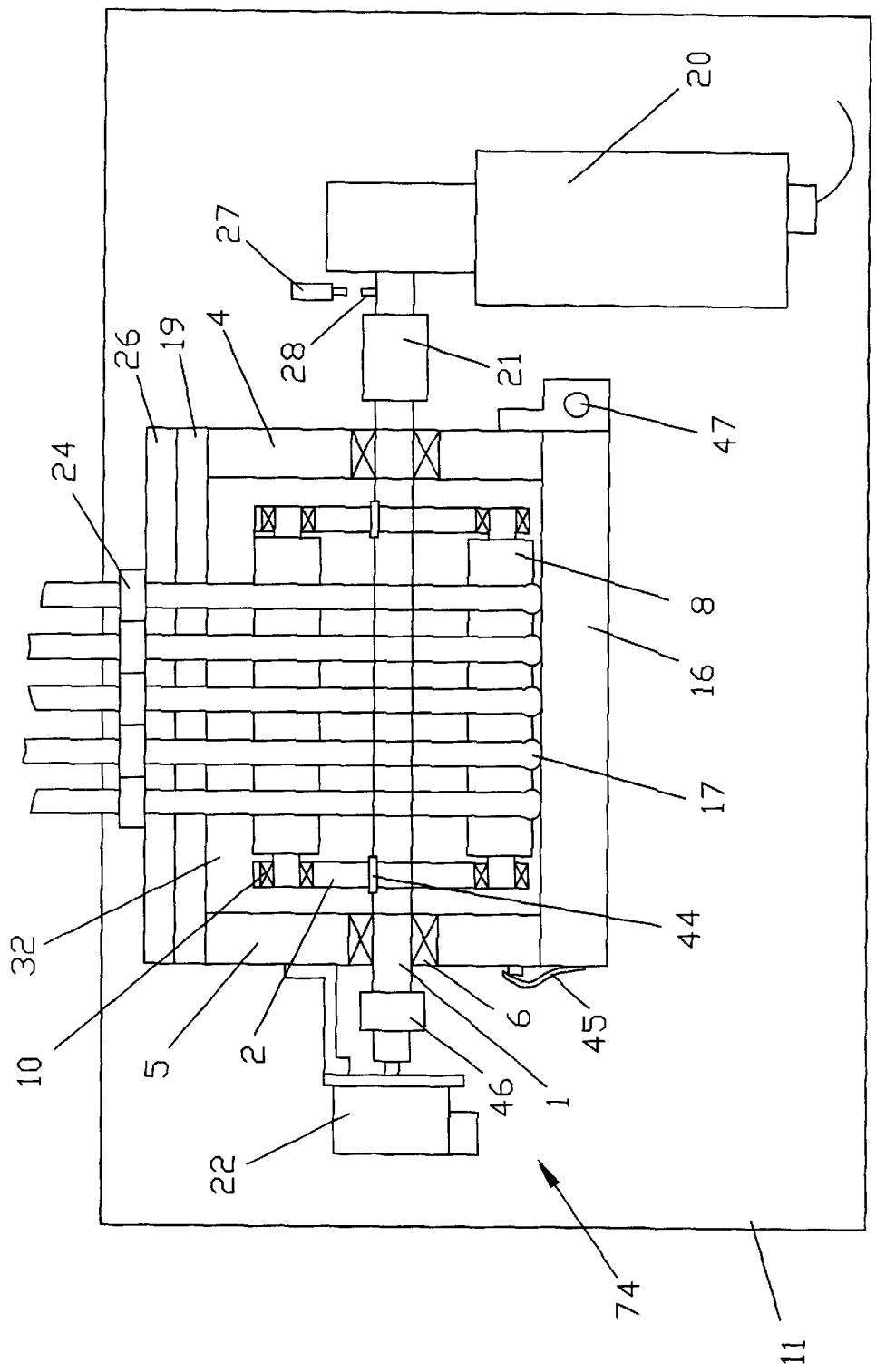
FIG. 2 is a front elevational view of the peristaltic dispenser of the filling machine.

FIG. 2 is a front view of the rotary peristatic dispenser pump 74 showing further details thereof The cross plate 19, top plate 26, stationary end plates 4 and 5, and the bottom curved backing plate 16 form the dispenser chamber 32.

Figure 3:
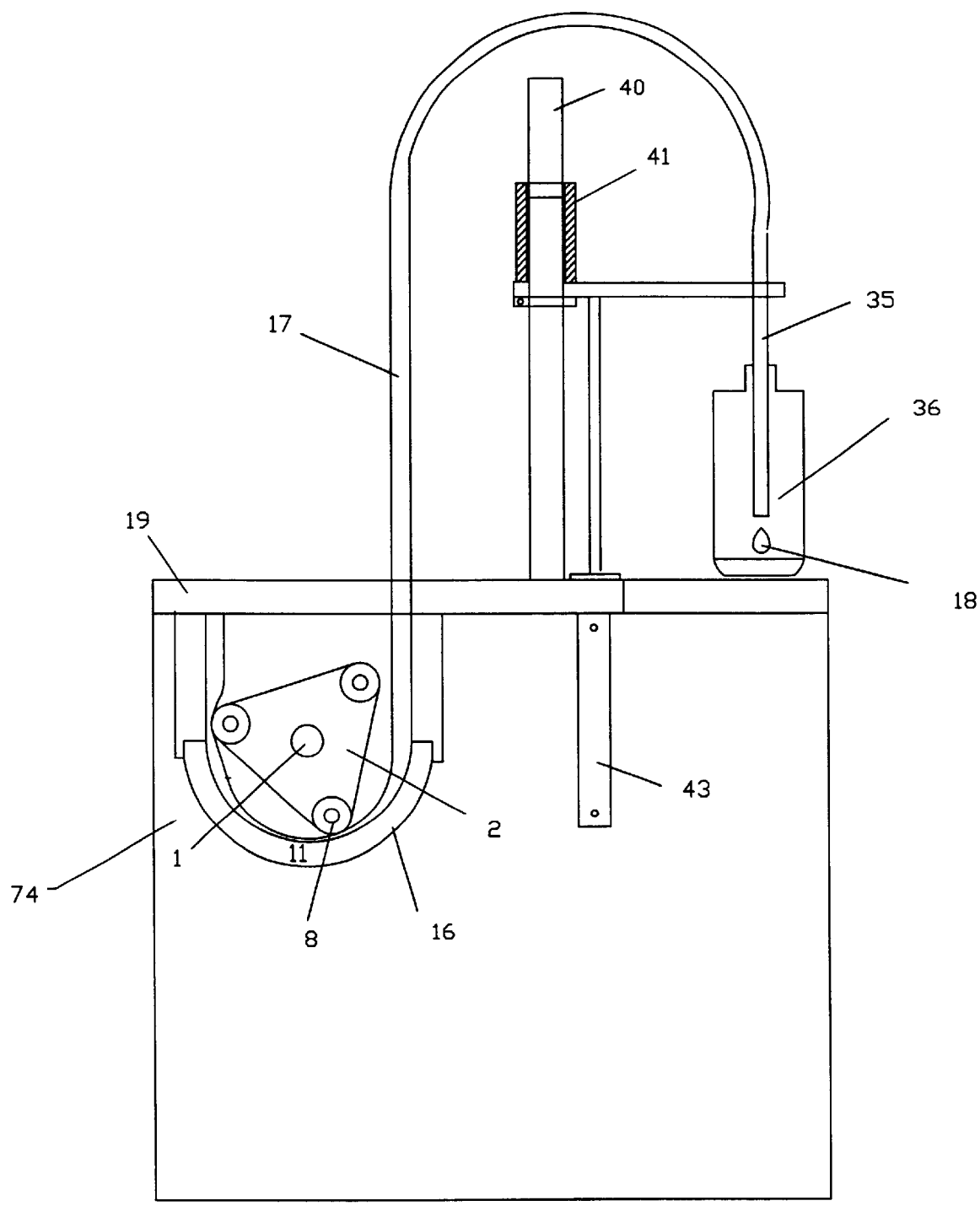
FIG. 3 is a diagrammatic sectional view of the peristaltic dispenser, machine frame and a collection container.

In the preferred embodiment the dispenser chamber 32 includes a set of three axially parallel rollers 8. Each roller 8 is disposed in a pair of bearings 10 that are mounted to rotatable support means such as a pair of driving plates 2. The driving plates 2 can be of any suitable configuration. For example, FIG. 1 illustrates circular driving plates 2 whereas FIG. 3 shows driving plates, which are triangular in shape. Thus, each roller 8 is capable of rotation about its longitudinal axis.

A rotor 1 having a generally horizontal axis is mounted in a pair of bearings 6, which are disposed in the stationary end plates 4 and 5. The driving plates 2 are coupled to rotor 1 by suitable attaching means such as keys 44. The rollers 8 are equally spaced and circumferentially disposed around rotor 1. Rotational movement of the rotor 1 causes the rollers 8 to orbit around the central axis of the rotor.

Figure 6:
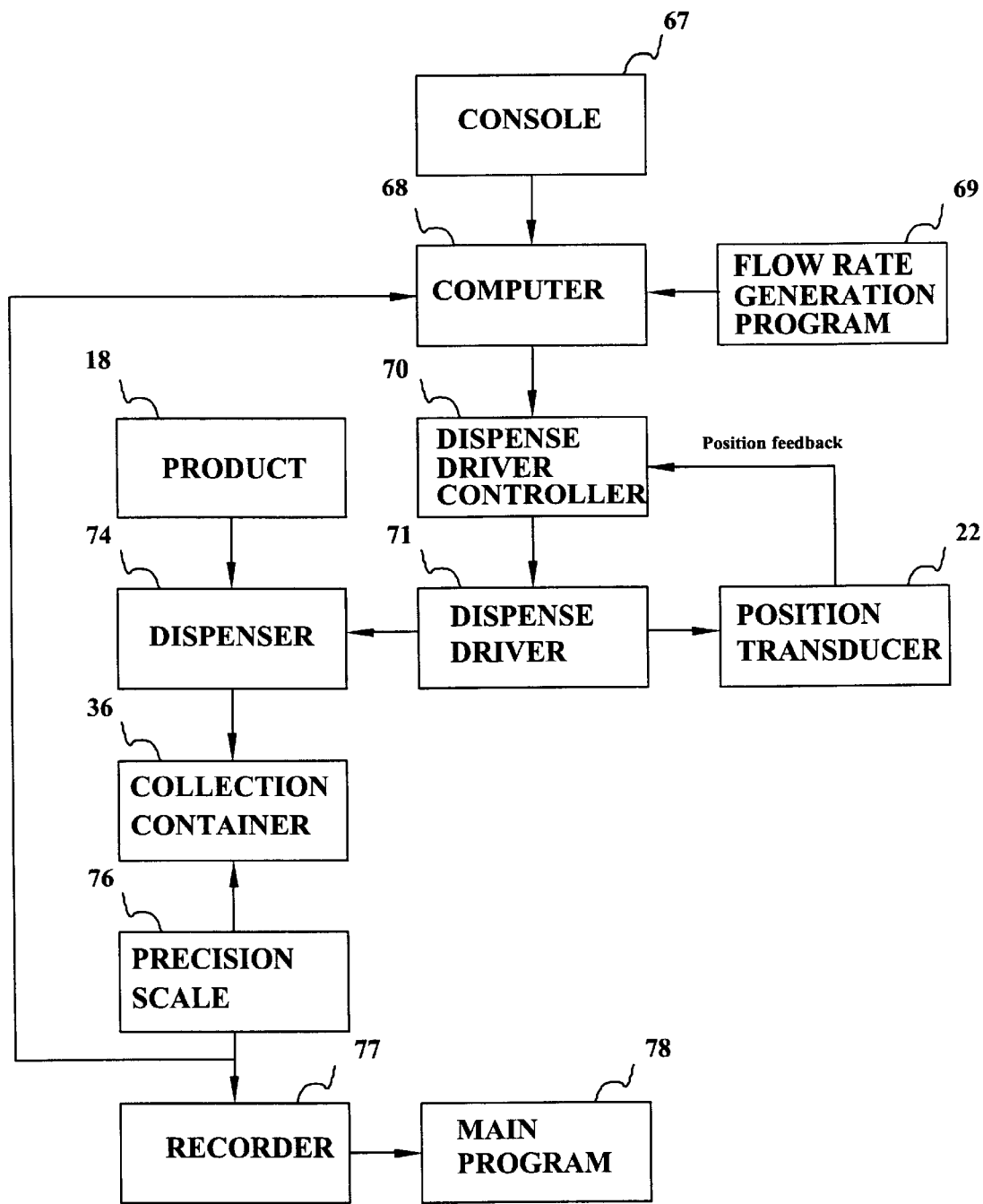
FIG. 6 is a block diagram illustrating the method for generating the flow rate characteristic and storing it in the main program of the computer for subsequent use during filling operations.

The rotor 1 extends beyond the stationary end plates 4, 5 and includes driving means thereon to enable connection to the shaft of the motor 20, which shaft serves as dispense driver 71 and which is controlled by computer 68 through dispense driver controller 70 as depicted in FIG. 6 This connection between the components can be made by for example by coupling 21 as seen in FIG. 2.

Although FIG. 2 shows a vertically mounted drive motor 20 with a coupling, alternatively, a horizontally mounted motor with a belt (not shown) can be used to connect the motor 20 to the rotor 1 of the dispenser pump. A position transducer 22 is connected to either end of the motor shaft by a coupling 46.

The position transducer 22 sends the position of rotor 1 to the dispense driver controller 70 as depicted in FIG. 6. The computer 68 includes a main program 78 and a flow rate generation program 69 for determining the nonlinear flow rate characteristic of the rotary dispenser pump 74. As described hereinafter in further detail, the computer 68 calculates the target position and a volume set point of the dispense rotor 1 corresponding to the precise fill volume to be delivered to containers 36 prior to initiating rotational movement of the dispenser 74 based on the flow rate characteristic.

The position and movement of the rotor 1, driving plates 2 and rollers 8 is controlled by a closed loop position feedback system or servo system wherein the position transducer 22 provides position feedback to the computer 68 as shown in FIG. 6. Alternatively, the same result may be achieved by using a so-called step motor control as long as the computer 68 keeps track of the current position of the step motor and relates it to the rotor position.

In any case, rotor position feedback must be provided to the computer 68 such that at the time the filling operation commences, the computer 68 is informed about the initial position of the rollers 8. For example, this may be accomplished by using a "home position" sensor 27 mounted on the machine frame, which is capable of reading the position of a reference stud or pin 28 affixed to the rotor 1.

Figure 4A:
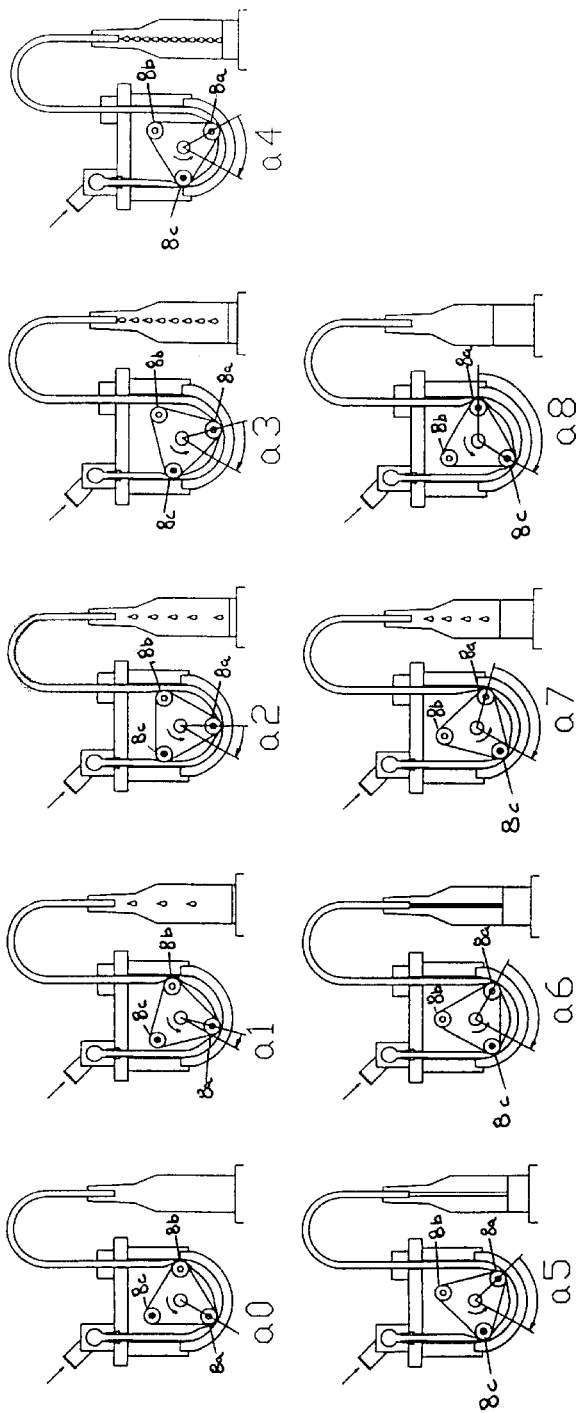
FIG. 4a taken collectively is a sequential composite view of the peristaltic dispenser in nine different stages of the filling cycle.
Figure 4B:
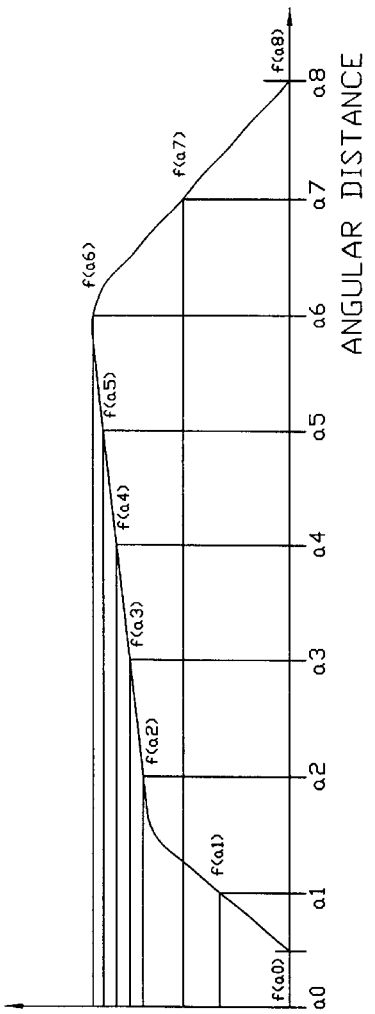

FIG. 4a shows a series of sectional views of reduced size illustrating the rotary peristaltic filling machine 10 in nine different angular positions, $a_0$ to $a_8$ of the rollers 8. The nine positions show sequentially one pulse of filling, which is referred to hereinafter as one cycle of the flow rate characteristic of the pump. FIG. 4b shows the corresponding flow rates $f(a_n)$ for each of the positions of the rollers in FIG. 4a. Thus, flow $f(a_0)$ in FIG. 4b corresponds to the position of the rollers $a_0$ in FIG. 4a; $f(a_1)$ in FIG. 4b corresponds to the position $a_1$, etc.

Position $a_0$ in FIG. 4a designates the starting position of the cycle. Position $a_0$ shows rollers 8a and 8b pinching the tubing such that product is trapped between rollers 8a and 8b. Roller 8b is at the top right of the curved backing plate 16. When the rollers turn an angular distance $a_1$, from the starting position, fluid inside the tubing is propelled in a counterclockwise direction. The resulting flow rate when reaching the position $a_1$ is $f(a_1)$ in FIG. 4b. Note that roller 8b is no longer pinching the flexible tubing and the product has been forced through the tubing by the rolling action of roller 8a. Likewise, upon moving to position $a_2$, roller 8a continues to move product forward. The flow rate when reaching position $a_2$ is $f(a_2)$.

Critical to an understanding of the present invention, it will be appreciated that the flow rates $f(a_1)$ and $f(a_2)$ shown in FIG. 4b are distinctly different. In marked contrast, it is reiterated that the prior art models described hereinabove assume the flow rates to be linear and to deliver an equal volume of product for the same angular rotation of the dispenser. It will be noted the general shape of the flow rate characteristic represented in FIG. 4b in going from $a_0$ to $a_8$ indicates the following: the flow rate first starts at zero and then increases sharply until reaching a point between $a_1$ and $a_2$; from this point forward the flow rate continues to increase but at a slower rate until reaching $a_6$; thereafter, the flow rate decreases sharply until reaching $a_8$. It will be understood that because there are three rollers 8 comprising the dispenser 74, each 360 degree revolution of the dispense rotor 1 will produce three pulses. To relieve prolixity in this disclosure, the second and third pulses are not illustrated because they are substantially identical.

At the end of the third pulse of one revolution of the rotor, the rollers 8a–8c will return to the position $a_0$. It will be appreciated that in actual practice, the present flow characteristic is determined using more than the nine sample positions shown in FIG. 4b. The number of samples to be chosen depends on the required fill weight precision and the rate at which it is desired that the filler process the calculations. For example, a typical sampling would be 256 samples per pulse or per one cycle of the flow rate characteristic of the dispenser.

Figures 5A, 5B:
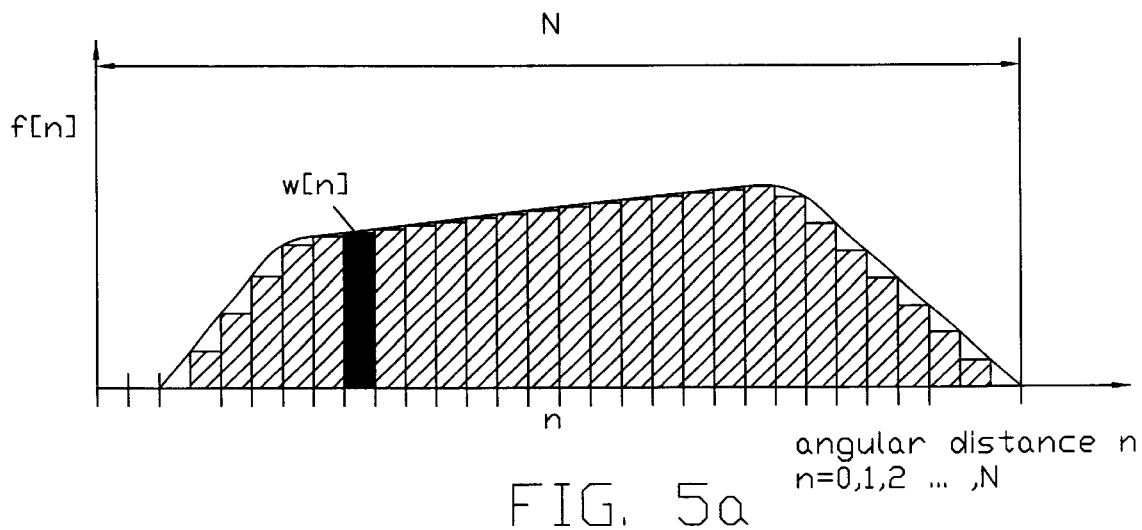
FIG. 5a is a graphical representation of the flow rate as a function of angular rotation illustrating the division of the angular distance into thin regular intervals for calculation of the weight delivered by one pulsation cycle of the peristaltic dispenser.
FIG. 5b illustrates a look-up table that is generated from sampling the pulse N times.

In FIG. 5a the flow rate characteristic of one pulse is divided into N equal intervals. The designator "n" represents each incremental angular roller position sampled, n=1,2 . . . N. The flow rate corresponding to each roller position is f(n).

The flow rate is expressed in flow units per angular distance. Thus, the flow rate times each incremental angular distance represents the weight w[n] dispensed in moving the dispense driver from an angular distance n to the next n+1 angular distance. The incremental weight w[n] is graphically represented by the darkened rectangular strip as shown.

The cumulative weight dispensed in one pulsating cycle is approximated by dividing the entire area under the curve into N strips and adding them together (cross-hatched area as shown in FIG. 5a), which in the limit, as N increases represents the exact area under the curve. The area under the curve can be represented by the mathematical expression:

$$Weight = \int_0^N f(n)dn$$

wherein:

∫ denotes the integration symbol f(n) denotes the flow rate characteristic dn denotes an increment in flow rate as the increment approaches zero.

Because the flow rate characteristic is a function that does not fit a single mathematical relationship, the present invention resorts to the numerical solution of digitizing the characteristic and generating a look up table linking each "n" value with a corresponding f(n) value. During operation of the filling machine, the weight is the set-point weight desired by the user of the machine. The variable that is unknown is the "n" value. This value cannot be readily determined from the above equation. The numerical method technique of incrementing "n" by one unit at a time and integrating the volume until the desired volume is reached is used as described hereinafter in further detail.

FIG. 5b represents a look-up table that will be generated from sampling a pulse N times. The values of f[n] are found by weighing the amount of product w[n] dispensed at each angular distance and dividing this amount by the angular distance.

FIG. 6 describes the procedure for determining the real flow characteristic of the present filling machine 100. The flow characteristic is generated by the use of the flow rate generation program 69. This calibrating program is accessible only to the manufacturer of the present filling machine 10. Once the flow rate characteristic is generated and stored in the system, further modifications are unusual.

An operator console 67, preferably of the touch-screen type, provides interaction with the computer 68 for setting or changing parameters. The computer 68 communicates with the driver controller 70 in order to move the dispense driver 71 and dispense product from the supply receptacle 30 into a collection container 36. The amount of dispensed product is preferably measured by precision scale 76 while the container 36 remains on said scale. In the case of a volumetric calibration, the precision scale 76 may be replaced with a device for measuring volume. The amount of dispensed product is then sent to the main program 78 via recorder 77.

Since the flow rate generation program 69 commands the dispenser 74 to move with a constant speed, the recorded flow rate characteristic is related to time intervals, which can be easily converted to the position of the dispense driver 71. For this, it is necessary to know the speed rate of the dispense driver, that is, its position as a function of time. The recorded flow characteristic can be made more accurate by sampling additional cycles and storing the average values obtained from the multiple cycles instead of the values of a single cycle. The underlying assumption to support the averaging is that the flow rate characteristic of the filling machine is a periodic function of the driver position. Once the cycle of the flow rate characteristic is defined, it is saved into the main program 78.

Figure 7:
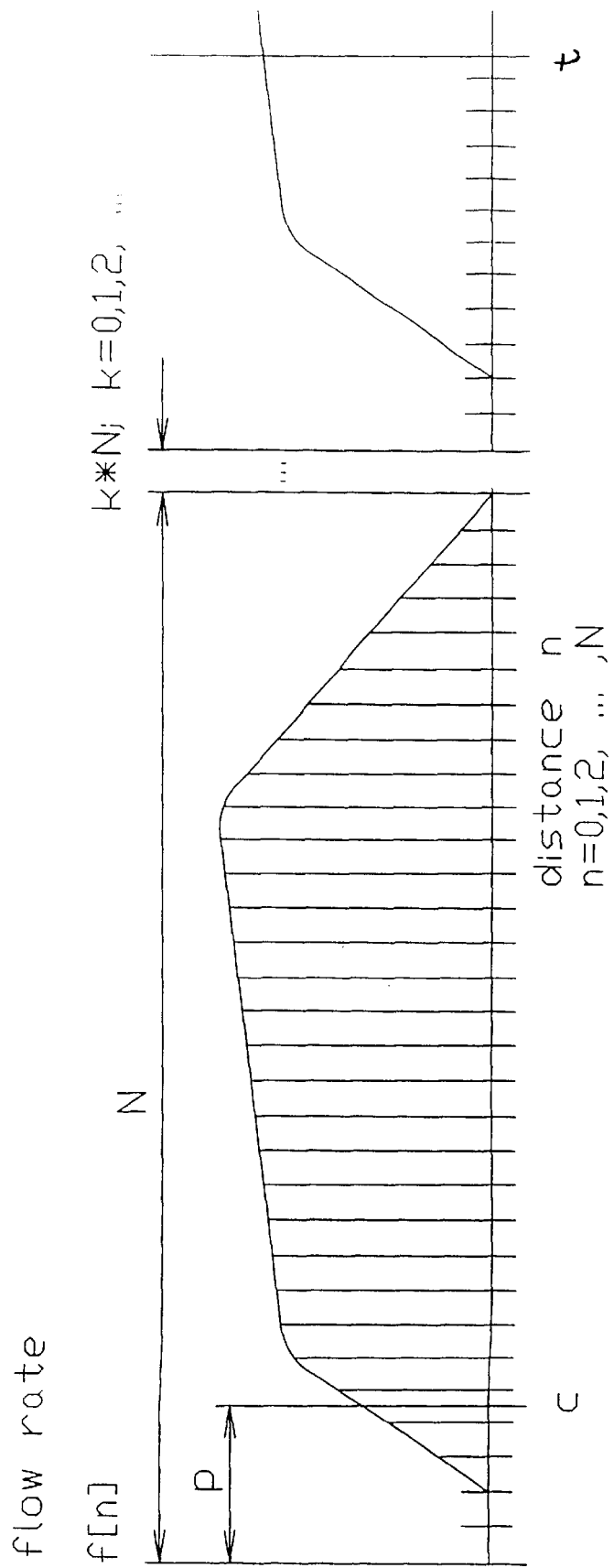
FIG. 7 is a graphical representation of the flow rate characteristic with various parameters used by the computer program to calculate the angular rotation of the rotor and deliver a pre-determined fill weight.

FIG. 7 shows the flow rate characteristic with various parameters that will be used by the computer program to calculate the angular rotation of the rotor needed to deliver a pre-determined fill weight. The flow rate pulse cycle is again divided into N equal intervals. Each successive interval is designated as the nth interval, where "n" is a variable representing a roller position and has the values of n=0,1, 2 . . . N. The designator f(n) denotes an array of fill weight rates sampled N+1 times and digitized to represent the flow rate characteristic of the dispenser. At a given point in time prior to delivering a fill volume, the rollers will be in a current position c as measured from the home position of the rollers. The home position of the rollers is a position that the rollers reach during the startup of the filling machine. This position is at an offset distance p from the beginning of the last cycle. The distance p may be represented by angular units, encoder pulses, or any other suitable unit measuring the angular rotation of the driver 71. The designator k represents an integer number of pulses from the current position to the target angular position t. The value k will be calculated by the computer based on the dispense volume desired.

Figure 8:
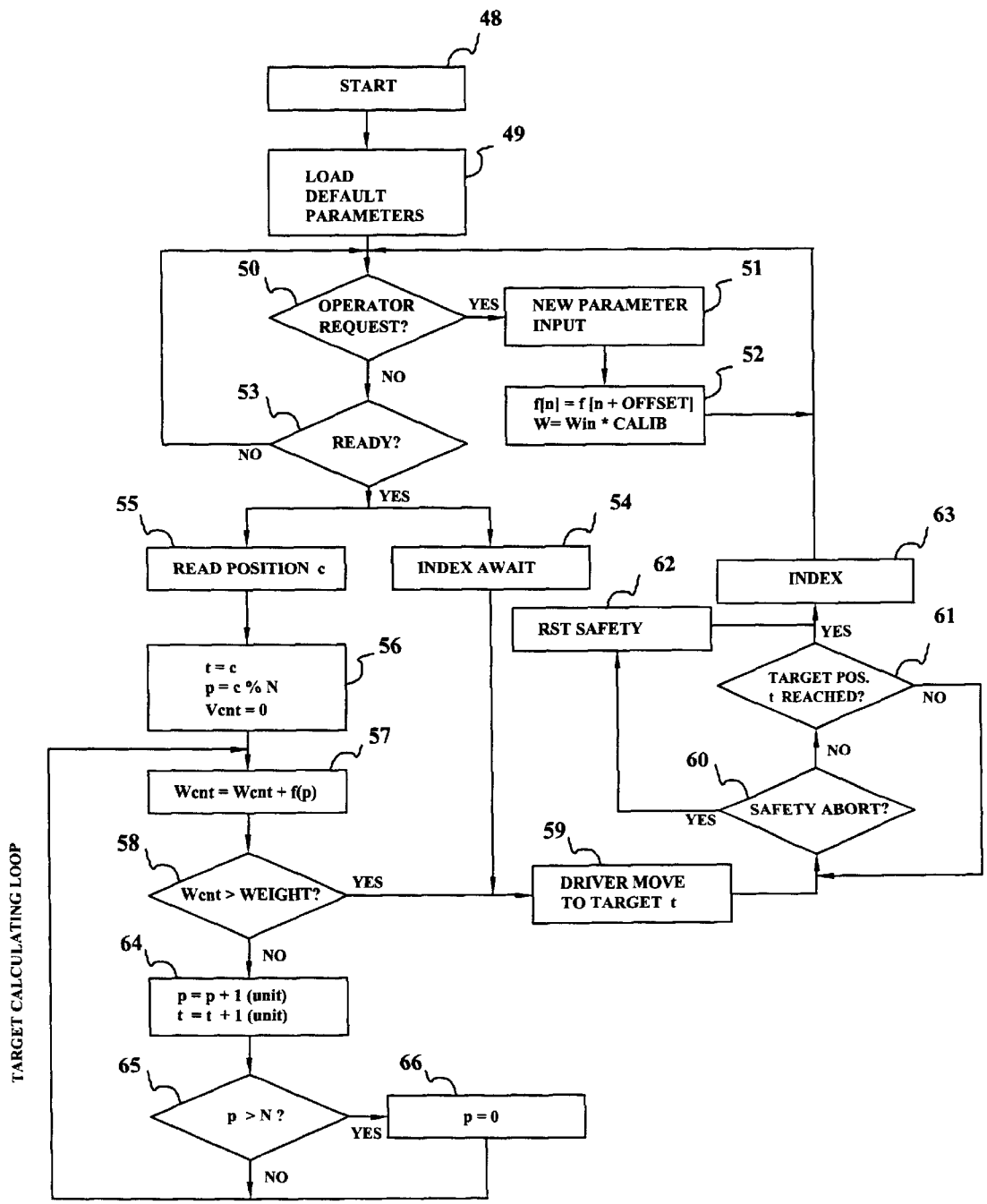
FIG. 8 is a flow chart of the process steps followed by the computer program in order to update filling parameters and calculate the target position of the driver.

Referring now to FIG. 8, when the filling machine 10 is turned on for production, start-up routine 48 is automatically loaded. This routine will command the driver 71 to move slowly in reverse until a computer input sent by sensor 27 (shown in FIG. 2) is received detecting the initial or home position signal. Thereafter, the home position of the rollers is correlated to the beginning of the flow characteristic stored in the memory of the computer. Once this correlation is made, on step 49 the program will default to loading the filling parameters that were used for the last filling operation prior to turning off the machine. The console will display these parameters on the touch screen of the console 67.

At step 50, the program will check whether there is an operator request to update the parameters. Step 51 shows that the parameters can be changed by touching the screen display and entering new parameters to meet the filing requirements of the product at hand.

The parameters can also be stored for different products and recalled upon entering a code for the respective product. Typical parameters that will be loaded are: WEIGHT—the desired fill weight; WEIGHTact—the fill weight actually obtained; CALIB—a calibration factor to assure proper translation of the desired fill weight and the fill weight actually obtained, which will compensate proportional error if any between the desired fill weight and the fill weight actually obtained revolutions per minute of the rotor); RPM—the desired revolutions per minute of the driver, which controls the filling rate at which product is dispensed through the discharge nozzles; ACC—the desired acceleration of the motor in reaching the filling rate; DIVE—activation or deactivation of diving nozzles, which may be desirable when dispensing low viscosity products to fill the containers from the bottom of the container upward to prevent air inclusion in the product itself that results in foaming and potential overflow; SUCKBK—the so-called "suck-back" rate, if any, at the end of the filling cycle if the pumping action needs reversal to suck a small amount of air into the end of the nozzle to prevent product drip and assuring a clean operation.

If any parameters are changed, the program proceeds with step 52, which updates the set-point and the flow characteristic. A parameter that will be typically updated at the beginning of the production run is the CALIB factor, which takes into account the physical characteristics of the pump and its associated tubing. The CALIB factor used in a prior production run will be able to deliver a fill weight that is close to the desired set-point. Thereafter, precise adjustment is accomplished by taring a collection container, dispensing product into it, determining the exact amount dispensed WEIGHTact, and feeding this information back to the system When the WEIGHTact is entered into the computer, the CALIB factor is automatically adjusted.

The program then goes to step 53 which is a check for any conditions that must be met prior to generating the start of the filling cycle. In step 54, the program will read the position c of the rollers by the use of the position transducer 22 connected to the sensor 27 of FIG. 2. Note that the position transducer 22 may be eliminated if the system contains other means of determining the current position such as keeping track of the pulses sent to a step motor for movement.

Next, the program will proceed with step 55 as follows: First, the program will set the initial target position t as the current position of the rollers c read on step 54. The variable t will later be part of the target calculating loop and act as a counter of how many times the integration process is performed and, thus, will establish the new target position of the rollers. Second, the relative driver position p will be calculated from the current position c read on step 54. Note that the position p is a relative driver position taken from the beginning of the last cycle of the flow characteristic to the current driver position. The position p may be represented by the following mathematical formula:

$$p = c \% N$$

where the operator % denotes the calculation of the remainder of the integer division c/N, where N is the number of samples in one cycle of the flow characteristic. For example, p=10%3 results in a value of p=1 because 10/3 is 9 with a remainder of 1.

A more specific example applicable to this application would be the following: If the pulse characteristic was sampled 256 times, i.e. N=256 and the current position c of the rollers is found to be at the position 800, this means that p=800%256 gives a value of p=32 (800/256 is 2 with a remainder of 32); this means that 2 cycles fit in with a remainder, or the relative position of the rollers from the beginning of the cycle is position 32. Third, a buffer variable, Vcnt that will be used for holding intermediate results of progressive integration of the flow characteristic is set to zero at this step.

The program will then start the target calculating loop until obtaining the target position t. The target calculating loop works in the following manner: In step 56, starting from the current position t=c, the buffer Vcnt will be increased by the corresponding flow differential f(p) defined in the look-up table. In step 57 the program will compare the buffer value against the set-point weight. If the value of Vcnt is greater than the set-point weight, then the loop will end and the driver will move to the target t under step 58. If the value of Vct is not greater than the set-point weight, then the value of the parameters p and t will be each increased by one unit as shown in step 64. In step 65 the value of p will be compared to the value of N. If the value of p is greater than the value of N, then the value of p is reset to 0 under step 66. On the other hand, if the value of p has not reached N yet, the value of p is sent back to step 56 to begin another calculation of the loop. The reason for setting p back to zero is that only one cycle of the flow rate characteristic is stored in the computer memory. It is assumed that all cycles of the characteristic are the same. Once the end of the cycle is reached it is necessary to go to the next cycle. Thereafter, the loop continues to run until Vcnt is greater than WEIGHT. At that point step 58 takes control and directs the driver to move to the target t.

In addition to the target calculating loop, there are many ways of calculating the target for the dispense driver 71 based on the flow characteristic in order to control the precise volume of product to be delivered. For example, the dispense driver movement may be controlled based on a closed-loop servo system with position feedback provided by position transducer 22 utilizing a well known motion servomotor system or, in the alternative, it may be controlled based on an open-loop utilizing, for example, a step motor where position is assumed by the number of pulses sent to the motor driver. Note that the target distance will be different each time. A theoretical example where the target distance would always be the same is the case in which each cycle comprises an integer multiple of the pumping weight of one pulse in which case the target distance would be the same for each filling cycle. However, this case is not likely to arise in practice as it would require custom sizing of tubing for the precise weight to be delivered and most tubing is available only in standard sizes.

In step 59 the system will verify the presence of a collection container under the discharge nozzle and wait for indexing to take place before proceeding to the next step. The advantage of proceeding is this manner is that production speed is increased by calculating the new rotor target position while the containers are traveling to the fill station. In step 60, the program will check whether an interruption in the filling cycle is necessary. The need for interrupting the cycle may arise for safety or any other reason. If an interruption is caused, the program will only continue the operation after the safety flag is reset as shown in step 62. Otherwise, the program will continue under step 61 to check whether the target position t has been reached. Thereafter, the program will index the filled collection container under step 63. The program will then be ready to start filling the next container and will operate routine 50 and repeat all the above described operations for the next production cycle.

Figure 9:
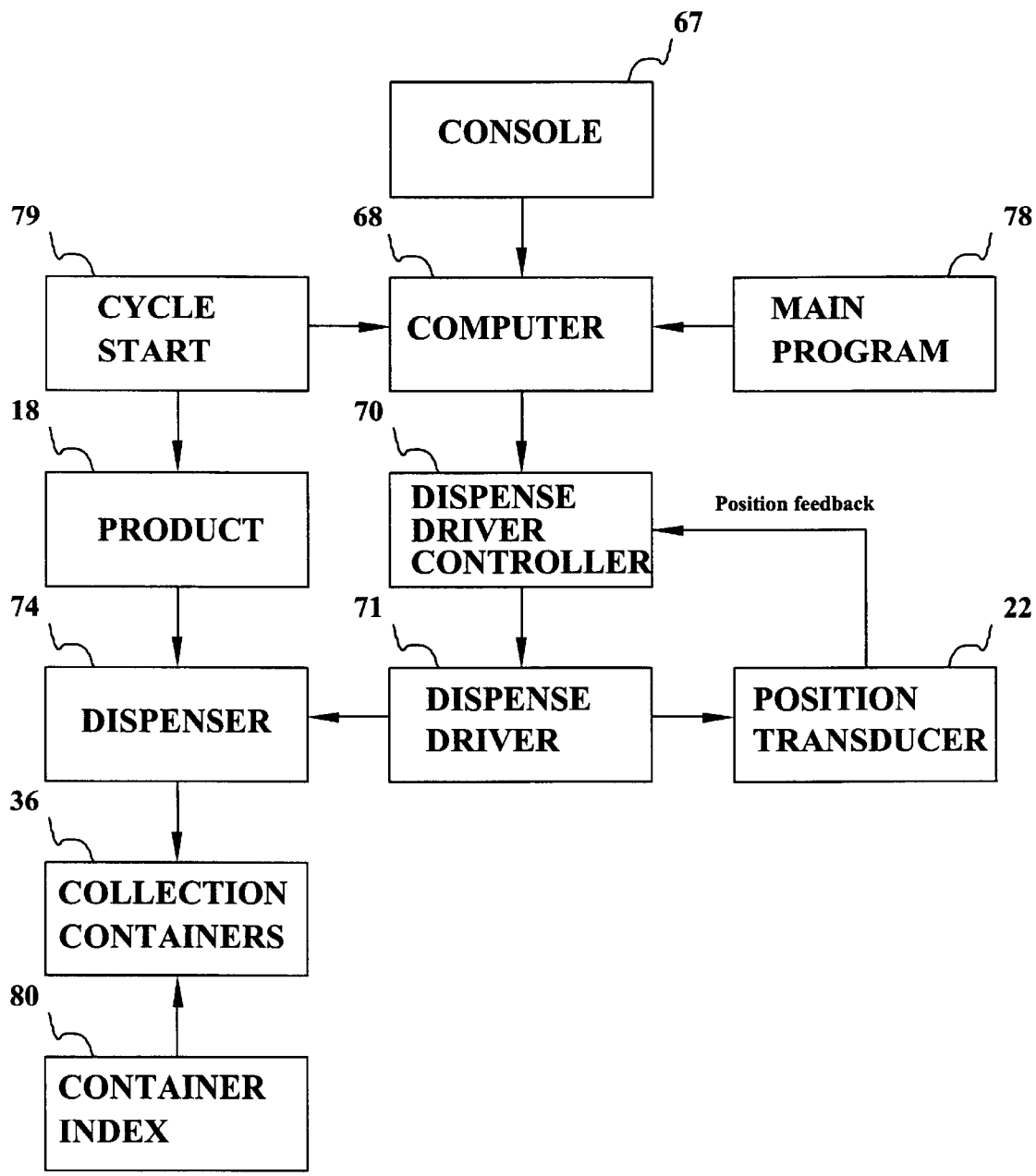
FIG. 9 is a system block diagram illustrating the operation of the filling machine during a typical production run.

Referring now to FIG. 9 with the rotary peristaltic action precision pump filler loaded with tubing, the process of filling individual collection containers disposed below the discharge nozzle is ready to commence. Console 67, provides a display of the current filling parameters and provides a way to interact with the computer 68 for changing parameters. At this stage, it is assumed that the filling machine contains updated parameters for the product at hand and that any necessary steps described in the flow chart of FIG. 5 have been completed. It is assumed that the flow characteristic is already stored in the computer memory for use by the main program 78. Thus, the system is ready for operator activation of cycle start command 79. As described in the flow chart of FIG. 6, the main program 78 contains one full cycle of the sampled and digitized flow rate characteristic. The position transducer 22 provides position feedback directly or indirectly to establish the current position c of the rollers per step 54 of the flow chart of FIG. 8. Once the target position t is established by the target calculating loop described in FIG.8, the master computer 68 commands the dispense driver controller 70 to provide a signal to the dispense driver 71 to move to the target position t (shown as step 59 in FIG. 8). The computer 68 communicates with the driver controller 70 in order to move the dispense driver 71 and dispense product from the supply receptacle 30 into the collection containers 36 with dispenser 74. Thereafter, the container index 80 causes the containers to advance so that a new set of empty containers moves under the discharge nozzles and the cycle is repeated.

FIG. 3 provides a diagrammatic sectional view of an alternative embodiment of the present rotary peristaltic filling machine 10 and an optional feature consisting of diving discharge nozzles 35. In this embodiment, an air cylinder 43 is mounted on the machine frame so as to provide up and down movement of the discharge nozzles 35. The discharge nozzles 35 are secured inside nozzle holders 51. The nozzle holders 51 are mounted in plate 50, which can ride up and down column 40 on bearing 41. When product 18 enters the dispenser 74 and is propelled into collection container 36, the cylinder pushes plate 50 upward so that the discharge nozzles 35 are slowly raised during the filling cycle. In some cases it may be necessary to have synchronized movement of the nozzles 35 with product filling for so-called "bottom-up" filling, which can be easily achieved by the present filling apparatus.

Although not specifically illustrated in the drawings, it should be understood that additional equipment and structural components will be provided as necessary, and that all of the components described above are arranged and supported in an appropriate fashion to form a complete and operative system incorporating features of the present invention. It is also understood that variations may be made in the present invention without departing from the scope of the invention.

Moreover, although illustrative embodiments of the invention have been described, a latitude of modification, change and substitution is intended in the foregoing disclosure, and in certain instances some features of the invention will be employed without a corresponding use of other features. For example, the driving device encompasses any other means of generating motion that can be monitored, including pneumatic and hydraulic means. Further, once the target position is reached by the dispense driver, the product dispensing operation is finished and depending on the application, other operations can be take place. For example, so-called suck-back for dripless operation, nozzle shut-off valve closure, filling nozzle movement if diving nozzles are used, or container indexing.

Accordingly, it is appropriate that the appended claims be construed broadly and in a manner consistent with the scope of invention.

What is claimed is:

1. In a rotary peristaltic filling machine of the type including a rotary peristaltic dispenser having a motor-driven dispense rotor mounted in parallel relation to a plurality of circumferentially disposed rollers, a plurality of flexible product transfer tubes including discharge nozzles, a dispenser chamber for containing said dispense rotor and further including a curved backing plate wherein said transfer tubes are disposed in operative relation around said rollers and compressed against said backing plate along the length of said tubes to dispense a quantity of a product contained therein through said discharge nozzles into collection containers, said filling machine further including a computer processor having associated circuitry and components for providing digitally controlled rotation of said rotor to dispense said product, a method of compensating for the nonlinear, pulsating flow rate characteristic of said peristaltic dispenser, said method comprising the steps of:

sampling one pulse cycle of said flow rate characteristic of said dispenser based upon predetermined position increments of said rollers by weighing the amount of said product at each of said position increments of said rollers;

calculating the flow rate at each of said position increments of said rollers by dividing the weight of the dispensed product by the angular rotation of said rollers which generated said dispensed product;

generating a flow rate characteristic look-up table to store the values derived from said sampling step linking said flow rates and said position increments of said rollers;

monitoring the position of said dispenser using sensing means prior to dispensing a quantity of said product;

locating the current position of said dispenser on said look-up table including a corresponding flow rate characteristic;

integrating said flow rate characteristic based on said look-up table starting from a current position of said dispenser and increasing rotation one angular position increment at a time to calculate a target position of said rollers;

determining a subtotal of the weight of said product delivered;

comparing said weight of said product delivered to a calibrated set point corresponding to a desired fill weight;

repeating said step of integrating until said desired fill weight is attained; and advancing said rollers to said target position to attain said desired fill weight.

2. The method of claim 1 wherein the step of integrating is represented by the equation:

$$\int_0^N f(n)dn$$

wherein: $\int$ denotes the integration symbol, $f(n)$ denotes the flow rate characteristic, and $dn$ denotes an increment in flow rate as the increment approaches zero.

3. The method of claim 1 wherein the step of determining is carried out by a precision scale.

4. The method of claim 1 wherein the step of determining is carried out by a volumetric probe.

5. An apparatus for compensating for the nonlinear, pulsating flow rate characteristic of a rotary peristaltic filling machine of the type including a rotary peristaltic dispenser having a motor-driven dispense rotor mounted in parallel relation to a plurality of circumferentially disposed rollers, a plurality of flexible product transfer tubes including discharge nozzles, a dispenser chamber for containing said dispense rotor and further including a curved backing plate wherein said transfer tubes are disposed in operative relation around said rollers and compressed against said backing plate along the length of said tubes to dispense a quantity of a product contained therein through said discharge nozzles into collection containers, said rotary peristaltic filling machine further including a computer processor having associated circuitry and components for providing digitally controlled rotation of said rotor to dispense said product, said apparatus comprising:

means for sampling one pulse cycle of said flow rate characteristic of said dispenser based upon predetermined position increments of said rollers by weighing the amount of said product at each of said position increments of said rollers;

means for calculating the flow rate at each of said position increments of said rollers by dividing the weight of the dispensed product by the angular rotation of said rollers which generated said dispensed product;

means for generating a flow rate characteristic look-up table to store the values derived from said sampling step linking said flow rates and said position increments of said rollers;

means for monitoring the position of said dispenser using sensing means prior to dispensing a quantity of said product;

means for locating the current position of said dispenser on said look-up table including a corresponding flow rate characteristic;

means for integrating said flow rate characteristic based on said look-up table starting from a current position of said dispenser and increasing rotation one angular position increment at a time to calculate a target position of said rollers;

means for determining a subtotal of the weight of said product delivered;

means for comparing said weight of said product delivered to a calibrated set point corresponding to a desired fill weight;

means for repeating the integration of said flow rate characteristic until said desired fill weight is attained; and means for advancing said rollers to said target position to attain said desired fill weight.

* * * * *